March 24, 1970   TOMOHIKO AKUTA ET AL   3,502,164
LOAD VARIATION MEASURING APPARATUS
Filed Oct. 23, 1967
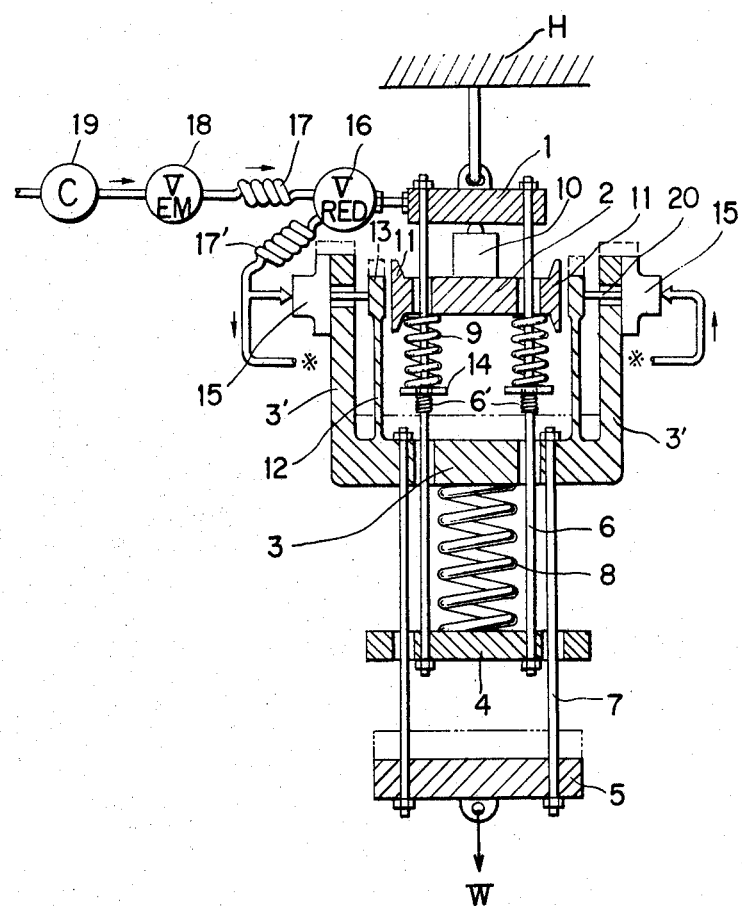
TOMOHIKO AKUTA AND
ATSUMI SEYA
INVENTORS
BY Wendroth, Lind & Ponack.
ATTORNEYS United States Patent Office 3,502,164
Patented Mar. 24, 1970

3,502,164
LOAD VARIATION MEASURING APPARATUS
Tomohiko Akuta and Atsumi Seya, Kitakyushu, Japan, assignors to Yawata Iron & Steel Co., Ltd., and Mitsubishi Seiko Kabushiki Kaisha, both of Tokyo, Japan
Filed Oct. 23, 1967, Ser. No. 677,111
Claims priority, application Japan, Oct. 24, 1966, 41/70,143
Int. Cl. G01g 23/14
U.S. Cl. 177—164                                      3 Claims

ABSTRACT OF THE DISCLOSURE

A load variation measuring apparatus using a load cell wherein a load cell receiving stand and a load receiving stand are separated from each other and only when a load variation is measured are both of said receiving stands brought into contact with each other through a friction clutch surface.

BACKGROUND OF THE INVENTION

Field of the invention

This invention relates generally to load variation measuring apparatus and more particularly to load variation measuring apparatus using a load cell and having an overload preventing device.

Description of the prior art

In measuring the amount or variation of the amount of molten steel contained, for example, in a ladle by means of a crane scale having a weighing device attached to a crane used in a steel making plant or the like, one method is by once measuring the gross weight including not only said molten steel but also such tares as the ladle itself and its suspending device and then subtracting the weights of such tares from said gross weight. However, such method will have a large measuring error if the weights of the tares are large and will be difficult to apply when measuring the variation of the amount of such molten steel with a high accuracy.

SUMMARY OF THE INVENTION

The present invention has as one object to improve such a load variation measuring apparatus having a load cell, and to provide a method of high accuracy measurement of, for example, the variation in the load of molten steel with a small error of less than 0.05%, such high accuracy being made possible by separating the load cell receiving stand and the load receiving stand so that both receiving stands contact at a friction clutch surface only when load variations are measured. Thus load variations only in the load of the sample but not the weight of tare are applied to the load cell.

Another object of the present invention is to provide a load variation measuring apparatus which has a simple structure and is easy to maintain, because the number of parts is less than in other apparatuses of the conventional type, and which is equipped with a protective device automatically starting to work under excessive load variations caused by mistake or accident in the operation of the apparatus, thus protecting the apparatus from damage.

A further object of the present invention is to provide a measuring apparatus wherein even a small load variation can be measured precisely when the tares are large not only on a single load control in making ingots in a steel making operation but also in any other field.

BRIEF DESCRIPTION OF THE DRAWING

The above objectives will be more clearly understood when considered in view of the accompanying drawing, in which:

The figure shows a measuring apparatus according to the present invention.

DESCRIPTION OF THE PREFERRED EMBODIMENT

The gist of the present invention is to have the load to be measured applied directly or through such media as a lever to the load receiving stand, to have the load cell supported by the load cell receiving stand, to have the load receiving stand and the load cell receiving stand contact at a friction clutch surface only when load variations are measured, and to select properly the place of and the force acting on the friction clutch surfaces, sliding movement of these surfaces taking place for a force in excess of a certain load capacity. This makes possible the measurement of load variations just when necessary and prevents the load cell from being damaged due to overload.

The present invention or specifically the load cell overload preventing means will be explained with reference to the drawing.

In the figure, a load W connected to a lever (not illustrated) in a hanging beam of a crane or directly to a load is received by a load stand 5. Said load stand 5 is connected to an upper balancing spring receiving stand 3 through connecting rods 7 and is balanced in the position shown in the drawing in which a balancing spring 8 is compressed. When the load W is removed, the load stand 5 will return to the original position (shown by the dotted line in the drawing). The balancing spring 8 is mounted on a lower balancing spring receiving stand 4. Said balancing spring receiving stand 4 is connected through connecting rods 6 to an upper load cell receiving stand 1 fixed to the hanging beam body B (only partially illustrated) or the like of the crane. The connecting rods 6 will act to push up a lower load cell receiving stand 2 through spring compression regulating plates 14 adjusted by screws 6' each fixed to a part of the connecting rod 6 and initial load setting springs 9 so that a load cell 10 may be loaded between the lower load cell receiving stand 2 and the upper load cell receiving stand 1. Further, the lower load cell receiving stand 2 has a precise frictional surface 11 on the outer periphery and is opposed to and spaced with a slight clearance from close contact frictional pieces 13 at the tips of respective combined load transmitting pieces and plate springs 12 extending from the peripheral part of the upper balancing spring receiving stand 3. There are air motors 15 fixed to respective strongs arms 3' extending to the outer peripheries of the combined load transmitting pieces and plate springs 12 and the close contact frictional pieces 13 from the outermost peripheral part of the upper balancing spring receiving stand 3. By the actions of said air motors 15, the above mentioned closed contact frictional pieces 13 will push and bend the combined load transmitting pieces and plate springs 12 and will be pressed against the frictional surfaces 11 on the outer periphery of the lower load cell receiving stand 2. To the air motor 15 is fed compressed air at a fixed pressure from an air compressor 19 through an opening and closing electromagnetic valve 18, flexible tube 17, automatic pressure reducing valve 16 provided with a filter and flexible tube 17.

The operation of this apparatus will now be described. Now, if a load W is applied to the load stand 5 and is balanced in the state shown in the figure, as no compressed air is being fed to the air motors 15 at this time, the frictional surface 11 on the outer periphery of the lower load cell receiving stand 2 and the close contact frictional piece 13 at the tip of the combined load transmitting piece and plate spring 12 on the periphery of the upper balancing spring receiving stand 3 will be completely separated from each other. In this state, the load cell 10 will show an initial output $C_o'$ depending on the force applied thereto by the setting of the initial load setting springs 9. When the electromagnetic valve 18 for compressed air is opened in this state, air at a fixed pressure will be fed to the air motors 15 and therefore the air motors 15 will operate to press inward the above described close contact frictional pieces 13 against the frictional surfce 11 on the outer periphery of the lower load cell receiving stand 2 through piston rods 20 so that the upper balancing spring receiving stand 3 and the lower load cell receiving stand 2 will be firmly connected with each other. At this time, the output of the load cell 10 will change somewhat from the previous output $C_o'$ and will become $C_o$. Then, if a load $\Delta W$ is removed, the change in compression in spring 8 will be produce a force corresponding to $\Delta W$ tending to push up the upper balancing spring receiving stand 3. But, as the receiving stand 3 is firmly connected with the lower load cell receiving stand 2 by friction by the above described operation of the air motors 15, the force produced in the balancing spring 8 will be applied directly to the load cell 10 which will then have an output $C_1$. Therefore, this change in load $\Delta W$ can be determined to be $\Delta W = C_1 - C_0$. Needless to say that, at this time, a tension will be applied to the connecting rods 6 between the upper load cell receiving stand 1 and the lower balancing spring receiving stand 4 by the sum of the load W at that time and the weight of the upper balancing spring receiving stand and other parts.

The features of the present invention are as follows. Now, in case the total load W is accidentally made $W=0$ by a misoperation or failure during such measurement of the load variation $\Delta W$ as is described above, then the balancing spring 8 will push up the upper balancing spring receiving stand with a force corresponding to the total load W. In the case of the above mentioned conventional apparatus, the total load W will be applied to the load cell. But according to the present invention, within a load allowed on the load cell, the close contact frictional piece 13 which is a part of the upper balancing spring receiving stand 3 will slide on the frictional surface on the outer periphery 11 of the lower load cell receiving stand 2 so that the load cell 10 will be subjected to a slide starting load W but to no more load and will be protected. The relation at this time can be expressed by the following formula:

$$W' = \mu \cdot N \quad (1)$$

wherein W' is a load in kg. for starting a sliding movement between the frictional surface 11 on the outer periphery of the lower load cell receiving stand 2 and the close contact frictional piece 13 which is a part of the upper balancing spring receiving stand, $\mu$ is the friction coefficient on the above mentioned frictional surface and N is the total pressure in kg. with which the above mentioned frictional piece 13 is pressed against the frictional surface 11 on the outer periphery of the lower load cell receiving stand 2 by the air motor.

As understood from the above mentioned Formula 1, the load W' for starting a sliding movement between the frictional surface 11 on the outer periphery of the lower load cell receiving stand 2 and the close contact frictional piece 13 which is a part of the upper balancing spring receiving stand can be properly selected by properly selecting the friction coefficient $\mu$ between the above mentioned frictional surface 11 and the frictional piece 13 and the normal force N with which the above mentioned frictional piece 13 is pressed against the frictional surface 11 on the outer periphery of the lower load cell receiving stand 2. This friction coefficient $\mu$ is determined by the material and degrees of finish of both parts to be in frictional contact, the presence of a lubricant and the peripheral temperature. Between steel materials themselves, usually a friction coefficient $\mu$ of about 0.3 to 0.4 will be obtained. Further, for the total pressure N, a substantially constant force can be obtained by properly setting the pressure of air fed to the air motor with the pressure reducing valve. Therefore, if the allowable load of the load cell 10 is made somewhat higher than the slide starting load W', the load cell 10 will be able to be perfectly protected while neglecting the influences of the peripheral temperature and the wear of the frictional surface. The protection at the time of a misoperation or failure during the measurement of the load variation $\Delta W$ has been described. However, as described already, at another time than the time of the measurement no compressed air will be fed to the air motor and therefore there will be a clearance between the frictional surface 11 on the outer periphery of the lower load cell receiving stand 2 and the close contact frictional piece 13 which is a part of the upper balancing spring receiving stand 3. Therefore, even if the above mentioned misoperation or failure is encountered, no overload will be applied to the load cell. For the above described reasons, the load cell 10 will be protected from being overloaded by a misoperation or failure irrespective of whether such misoperation or failure occurs at the time of measuring the load variation $\Delta W$ or at the time of not measuring it (such as while the crane is moving).

What is claimed is:
1. A load variation measuring apparatus comprising a load holding means for holding a load in a balanced state, a force generating means forming part of said load holding means and generating an unbalanced force in said load holding means upon the occurrence of variation of said load, force receiving means forming part of said load holding means and receiving said unbalanced force, a load cell means including a load cell and load cell receiving means for transforming a load to an electric signal, and a friction clutch means connecting the load cell receiving means with the force receiving means with a sliding frictional contact only at the time of measuring load variations.

2. An apparatus as claimed in claim 1 wherein said friction clutch means comprises a friction surface on the outer periphery of the load cell receiving means, and a movable friction clutch surface on the force means movable toward and away from said friction surface on the load cell receiving means.

3. An apparatus as claimed in claim 2 in which said force receiving means has a bendable arm fixed thereto and said movable clutch surface is on said bendable arm, and said apparatus further comprising means on said force receiving means for moving said movable clutch surface toward and away from said outer peripheral frictional surface and comprising an air motor having a piston rod connected to said movable clutch surface.

References Cited
UNITED STATES PATENTS
1,913,120 6/1933 Kanyon _____ 177—50
2,886,302 3/1959 Coffman et al. _____ 177—210 X STEPHEN J. TOMSKY, Primary Examiner
GEORGE H. MILLER, JR., Assistant Examiner U.S. Cl. X.R.
177—50